(12) United States Patent
Miyata

(10) Patent No.: US 7,898,137 B2
(45) Date of Patent: Mar. 1, 2011

(54) PERMANENT MAGNET AND PERMANENT MAGNET ROTATING MACHINE

(75) Inventor: Koji Miyata, Echizen (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 6 days.

(21) Appl. No.: 11/846,803

(22) Filed: Aug. 29, 2007

(65) Prior Publication Data

US 2008/0055032 A1 Mar. 6, 2008

(30) Foreign Application Priority Data

Aug. 30, 2006 (JP) ................................. 2006-233450

(51) Int. Cl.
*H02K 21/12* (2006.01)

(52) U.S. Cl. .......... 310/156.38; 310/156.43; 310/156.46; 310/156.53

(58) Field of Classification Search ............. 310/156.38, 310/156.43, 156.46, 156.53
See application file for complete search history.

(56) References Cited

U.S. PATENT DOCUMENTS

| | | | | |
|---|---|---|---|---|
| 5,397,951 A * | 3/1995 | Uchida et al. | ............ | 310/156.21 |
| 5,990,591 A * | 11/1999 | Yamaguchi et al. | ...... | 310/156.53 |
| 6,140,736 A * | 10/2000 | Hsu | ................ | 310/261 |
| 6,597,078 B2 * | 7/2003 | Crapo et al. | ............ | 310/156.01 |
| 6,707,209 B2 * | 3/2004 | Crapo et al. | ............. | 310/156.43 |
| 6,713,921 B2 * | 3/2004 | Sebastian et al. | ........ | 310/156.38 |
| 6,759,776 B2 * | 7/2004 | Takahata et al. | ......... | 310/156.38 |
| 6,759,777 B2 * | 7/2004 | Takahata et al. | ......... | 310/156.38 |
| 6,858,960 B1 * | 2/2005 | Muszynski | .............. | 310/156.47 |
| 6,885,122 B2 * | 4/2005 | Kaneko et al. | ........... | 310/156.38 |
| 7,474,027 B2 * | 1/2009 | Kikuchi et al. | ........... | 310/156.53 |
| 2002/0145352 A1 * | 10/2002 | Kimura et al. | ........... | 310/156.45 |
| 2004/0207280 A1 * | 10/2004 | Luo et al. | ................. | 310/156.47 |
| 2005/0225194 A1 * | 10/2005 | Murakami et al. | ............ | 310/216 |
| 2005/0258698 A1 * | 11/2005 | Miyashita et al. | ....... | 310/156.38 |
| 2005/0264122 A1 * | 12/2005 | Domeki et al. | .......... | 310/156.46 |
| 2006/0038457 A1 | 2/2006 | Miyata | | |

FOREIGN PATENT DOCUMENTS

| | | |
|---|---|---|
| EP | 1598920 A2 | 11/2005 |
| JP | 11-252833 A | 9/1999 |
| JP | 200660920 A | 3/2006 |

OTHER PUBLICATIONS

European Search Report dated Jul. 10, 2008, issued in corresponding European Patent Application No. 07253431.6.

* cited by examiner

*Primary Examiner* — Elvin G Enad
*Assistant Examiner* — Alexander Talpalatskiy
(74) *Attorney, Agent, or Firm* — Westerman, Hattori, Daniels & Adrian, LLP

(57) ABSTRACT

A permanent magnet has a D-shaped cross section including an arcuate top surface (22), a flat bottom surface (24), and side surfaces (26, 28). Provided that a plurality of permanent magnets are circumferentially arranged so that a great circle (S) circumscribes the apexes (P) on the arcuate top surfaces (22), the top surface (22) includes a central region which delineates an arc of a small circle (T) off-centered from the great circle, and end regions (22*a*, 22*b*) which are positioned outside the small circle (T) and inside the great circle (S).

7 Claims, 9 Drawing Sheets

PERMANENT MAGNET AND PERMANENT MAGNET ROTATING MACHINE

CROSS-REFERENCE TO RELATED APPLICATION

This non-provisional application claims priority under 35 U.S.C. §119(a) on Patent Application No. 2006-233450 filed in Japan on Aug. 30, 2006, the entire contents of which are hereby incorporated by reference.

TECHNICAL FIELD

This invention relates to a D-shaped permanent magnet, and a synchronous permanent magnet rotating machine comprising the same, such as a servo motor, DC brushless motor or power generator.

BACKGROUND ART

Due to high efficiency and precise control abilities, permanent magnet (PM) rotating machines are commonly used as control motors, typically servo motors. In AC servo motors, for example, a permanent magnet rotating machine with a radial air gap as illustrated in FIG. 7 is used. This PM rotating machine comprises a rotor 3 including a rotor core 1 and a plurality of D-shaped permanent magnet segments 2 attached to the surface of the core, and a stator 13 surrounding the rotor 3 to define a gap therebetween and including a stator core 11 having a plurality of slots and coils 12 wound on teeth and received in the slots. In the PM rotating machine illustrated in FIG. 7, the number of (permanent magnet) poles is six (6), the number of teeth is nine (9), and the arrow associated with a permanent magnet segment indicates a direction of magnetization thereof. With regard to the permanent magnet segments, magnetic orientation is effected in a parallel magnetic field so that a direction of easy magnetization is parallel to the center axis of the magnet segment. The coils are wound on teeth as a concentrated winding and connected in Y connection of three phases: U, V and W phases as shown in FIG. 8. In FIG. 7, the solid circle of a coil denotes that the coil winding direction is forward and the crossing (X) of a coil denotes that the coil winding direction is backward, with respect to the plane of paper.

When electric current flows across coils, magnetic fields are developed in the directions of broad arrows depicted in the stator core region, so that the rotor is rotated counterclockwise. At this point, an aft area of a permanent magnet segment in the rotating direction (a circled area of segment 2 in FIG. 7) is in a situation susceptible to demagnetization because the magnetic field is in an opposite direction to the magnetization of the permanent magnet segment. Commonly used permanent magnet materials include ferrite magnets such as barium ferrite and strontium ferrite and rare earth magnets such as Sm—Co and Nd—Fe—B magnets. Of these, the rare earth magnets now find a dramatically increasing use as the high-performance magnet.

In AC servo motors and similar motors requiring high precision torque control, the torque must have less ripples. Accordingly, it is undesired that when the permanent magnets rotate, the alignment of stator slots and the permanent magnets causes cogging torque to develop due to variations of the magnetic flux distribution across the gap (i.e., torque without current flowing across the coil) or torque ripples to occur when driven by current flowing across the coil. The torque ripples exacerbate controllability and additionally, cause noise.

The cogging torque may be reduced by configuring a permanent magnet segment to a cross-sectional D shape that tapers from the center toward transverse ends and includes an off-centered arcuate portion as shown in FIG. 9. With this configuration, the end portion of a permanent magnet segment which is a magnetic pole switch area developing a noticeable variation of magnetic flux distribution produces a smoothened magnetic flux distribution, reducing the cogging torque. The cogging torque may also be reduced by configuring a permanent magnet segment to a cross-sectional C shape that includes an off-centered arcuate portion as shown in FIG. 10. The D-shaped magnet is more effective for reducing cogging torque even if slightly off-centered, because its transversely opposed end portions are thinner than its central portion. Although off-centered magnets have a reduced volume and thus lead to a reduction of drive torque, a proportion of torque reduction is smaller with the magnet of D shape which can reduce cogging torque with a less off-centering. Then the magnet of D shape is superior to C shape.

An off-centered D-shaped magnet as shown in FIG. 9 has end portions which are very thin and susceptible to demagnetization. Now the reason why a thin gage magnet end portion is susceptible to demagnetization is described. The magnitude of demagnetization of a permanent magnet is determined by the magnitude of a coercive force and the magnitude of a diamagnetic field at the service temperature. The demagnetization susceptibility increases as the coercive force is lower and as the diamagnetic field is greater. The diamagnetic field is the sum of a self diamagnetic field created by magnetization of a permanent magnet and a reverse magnetic field from the exterior. To the permanent magnet end portion is applied a high diamagnetic field from the stator. The self diamagnetic field increases as the thickness of the permanent magnet in the magnetization direction is reduced.

Once the magnet is demagnetized, there arise problems that the drive torque is reduced and the cogging torque is increased due to a locally uneven magnetic field.

Reference should be made to JP-A 2006-60920.

DISCLOSURE OF THE INVENTION

An object of the invention is to provide a permanent magnet which is effective in reducing cogging torque and unsusceptible to demagnetization when used in a rotating machine; and a permanent magnet rotating machine comprising the same, having high output and high precision control capabilities.

Making efforts in further improving a rotating machine comprising off-centered magnets and featuring reduced cogging torque, the inventors have reached a rotating machine free of torque variations and unsusceptible to demagnetization.

In one aspect, the invention provides a permanent magnet having a D-shaped cross section including a generally arcuate top surface, a flat bottom surface, and side surfaces, said generally arcuate top surface including a central region with an apex and transversely opposed end regions. Provided that a plurality of permanent magnets are circumferentially arranged so that a phantom great circle circumscribes the apexes on the arcuate top surfaces of the magnets, the central region of the magnet top surface delineates a contour which is coincident with a phantom small circle off-centered from said great circle and having a smaller diameter than said great circle, and each of the transversely opposed end regions of the magnet top surface is positioned outside the intersection between said small circle and the magnet side surface and inside the intersection between said great circle and the magnet side surface.

In a preferred embodiment, the generally arcuate top surface includes an arcuate central region and transversely opposed linear end regions which extend from the ends of the central region to the side surfaces of the magnet and parallel to the flat bottom surface of the magnet.

In another preferred embodiment, the generally arcuate top surface includes an arcuate central region and transversely opposed linear oblique end regions which extend from the ends of the central region to the side surfaces of the magnet, and an extension of the linear oblique end region toward the arcuate central region passes the apex of the arcuate central region.

In another aspect, the invention provides a permanent magnet rotating machine comprising the permanent magnet defined above.

BENEFITS OF THE INVENTION

The D-shaped permanent magnet of the invention is unsusceptible to demagnetization, and can reduce cogging torque and increase drive torque. It is useful in the performance improvement and size reduction of AC servo permanent magnet motors and DC brushless permanent magnet motors. The invention is of great worth in the industry.

BRIEF DESCRIPTION OF THE DRAWINGS

In the following description, like reference characters designate like or corresponding parts throughout the several views shown in the figures.

DESCRIPTION OF THE PREFERRED EMBODIMENT

Figure 1:
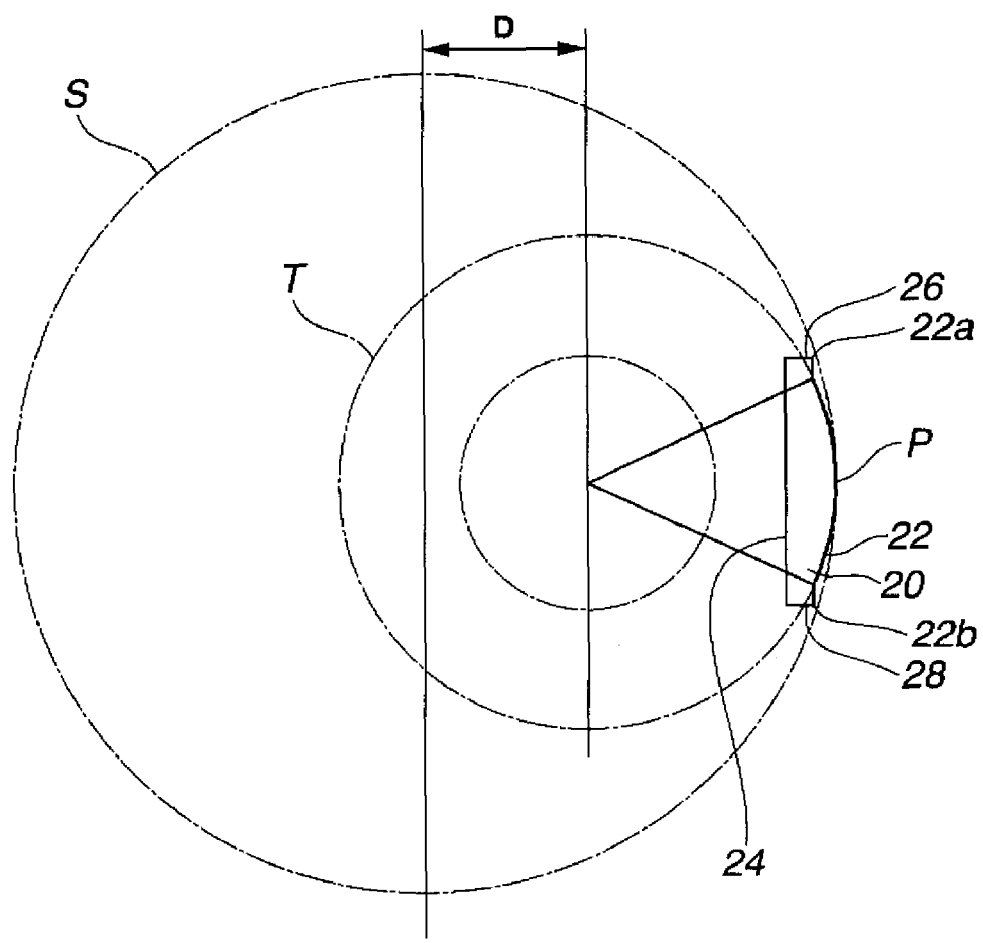
FIG. 1 is a cross-sectional view of a permanent magnet in one embodiment of the invention.

It is understood that terms such as "top," "bottom," "outward," "inward," and the like are words of convenience and are not to be construed as limiting terms.

As described above, the invention relates to a permanent magnet having a D-shaped cross section including a generally arcuate top surface, a flat bottom surface, and side surfaces, said generally arcuate top surface including a central region with an apex and transversely opposed end regions, wherein provided that a plurality of permanent magnets are circumferentially arranged so that a phantom great circle circumscribes the apexes on the arcuate top surfaces of the magnets, the central region delineates a contour which is coincident with a phantom small circle off-centered from said great circle and having a smaller diameter than said great circle, and each of the transversely opposed end regions is positioned outside the intersection between said small circle and the magnet side surface and inside the intersection between said great circle and the magnet side surface.

While a rotating machine comprises a rotor which has mounted thereon a plurality of permanent magnets, each magnet has an arcuate central portion which is off-centered relative to the great circle for reducing cogging and transversely opposed end portions which are kept relatively thick although they are otherwise designed extremely thin for demagnetization purpose. The machine produces smooth rotation with minimized cogging torque and no torque variations. The drawback of off-centered permanent magnets that magnet end portions are susceptible to demagnetization is mitigated.

Referring to FIGS. 1 to 6, the invention is embodied as a D-shaped permanent magnet. A permanent magnet 20 has a D-shaped cross section including a generally arcuate top surface 22, a flat bottom surface 24, and side surfaces 26 and 28. The generally arcuate top surface 22 includes a central region with an apex P and transversely opposed end regions 22a, 22b. A plurality of D-shaped permanent magnets are circumferentially arranged as shown in FIG. 7 (six magnets in FIG. 7) so that a phantom great circle S having a center and a diameter circumscribes the apexes P on the arcuate top surfaces 22 of the magnets. The central region of the top surface 22 of the magnet delineates a contour which is coincident with a phantom small circle T having a center shifted from the center of the great circle S and a diameter smaller than the diameter of the great circle S. Each of the transversely opposed end regions 22a, 22b is positioned outside the intersection between the small circle T and the side surface 26, 28 of the magnet and inside the intersection between the great circle S and an outward extension of the side surface 26, 28 of the magnet.

Figure 2:
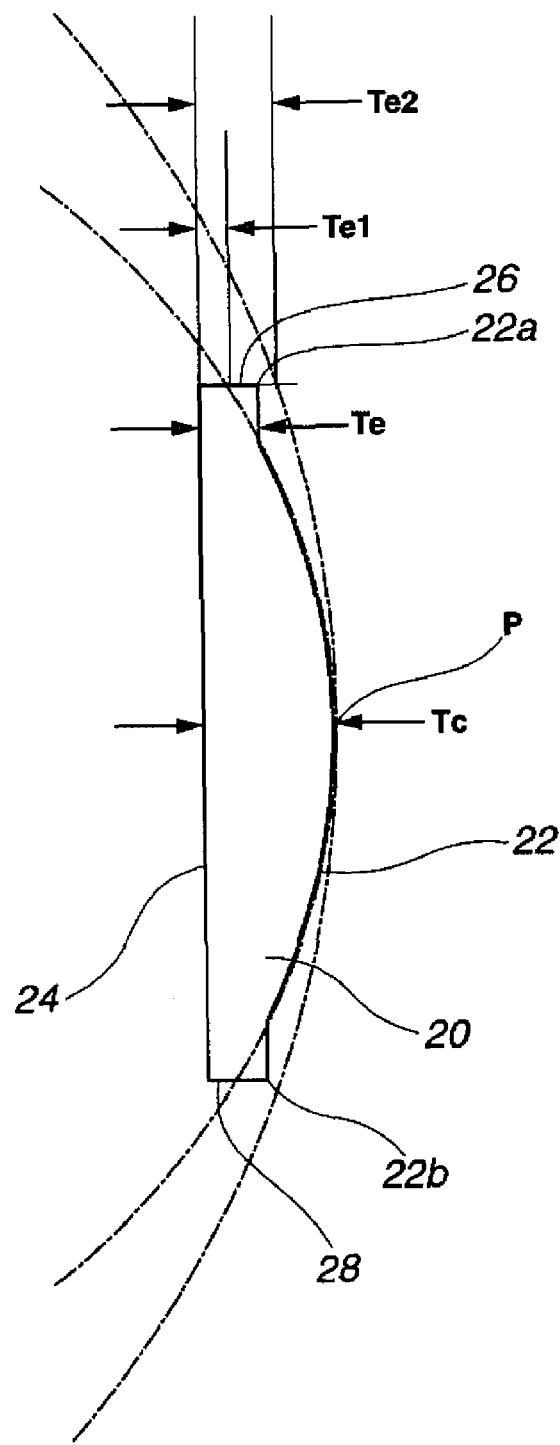
FIG. 2 is an enlarged view of the magnet of FIG. 1.

As shown in FIG. 2, the D-shaped permanent magnet includes an arcuate central portion having a thickness Tc and transversely opposed end portions having a thickness Te. Provided that Te1 is a distance from the bottom surface 24 to the intersection between the small circle T (central arcuate region) and the side surface 26, and Te2 is a distance from the bottom surface 24 to the intersection between the great circle S and an extension of the side surface 26, they satisfy the relationship: $Te1<Te\leqq Te2$. If $Te<Te1$, then substantial demagnetization occurs. If $Te>Te2$, then substantial cogging occurs.

Figure 4:
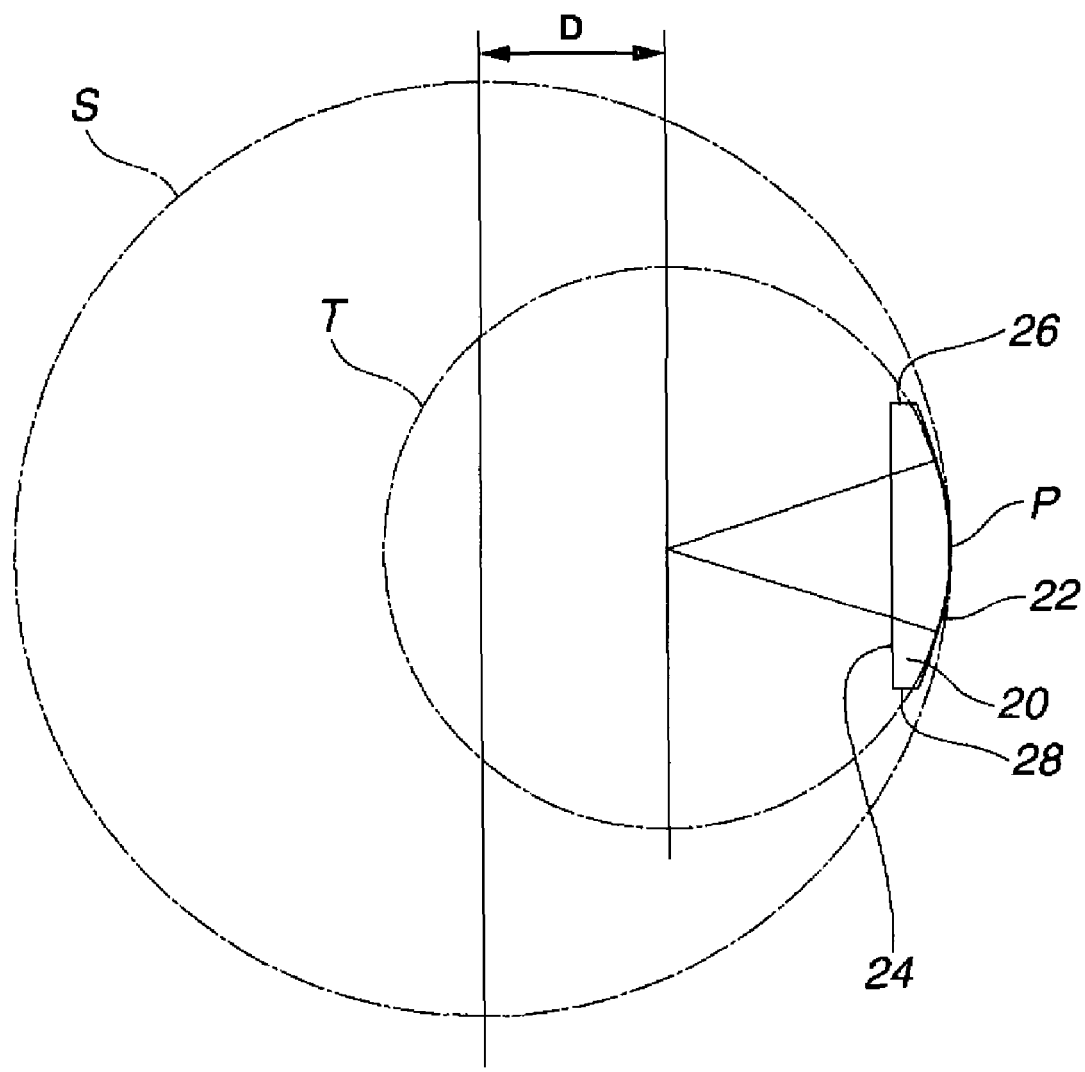
FIG. 4 is a cross-sectional view of a permanent magnet in another embodiment of the invention.

In FIGS. 1 and 4, D is a difference between a radius "s" of phantom great circle S and a radius "t" of phantom small circle T, that is, an off-centered distance. The ratio t/s is preferably from 0.3 to 0.8, and more preferably from 0.4 to 0.7.

Figure 3:
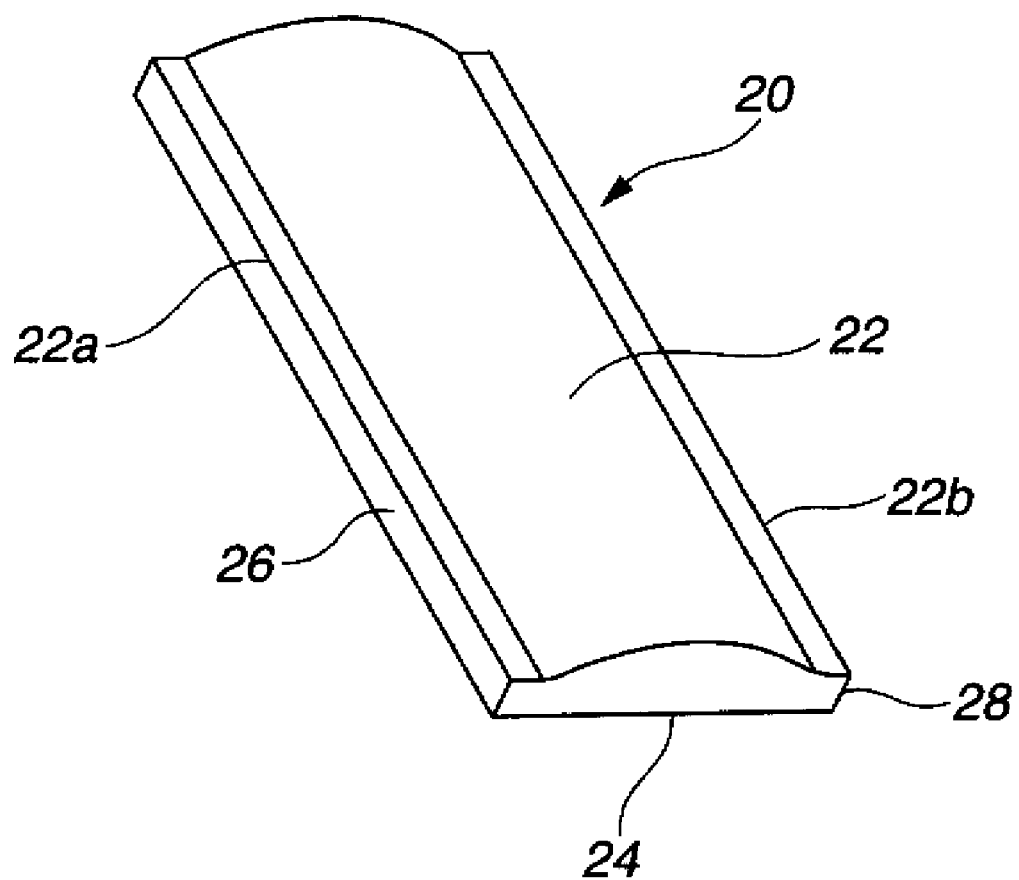
FIG. 3 is a perspective view of the magnet of FIG. 1.

In the magnet of FIGS. 1 to 3, the generally arcuate top surface 22 includes an arcuate central region and linear transversely opposed end regions 22a, 22b which extend from the ends of the central region to the side surfaces 26, 28 of the magnet 20 and parallel to the flat bottom surface 24 of the magnet 20. The transversely opposed end portions have a constant thickness Te.

Figure 5:
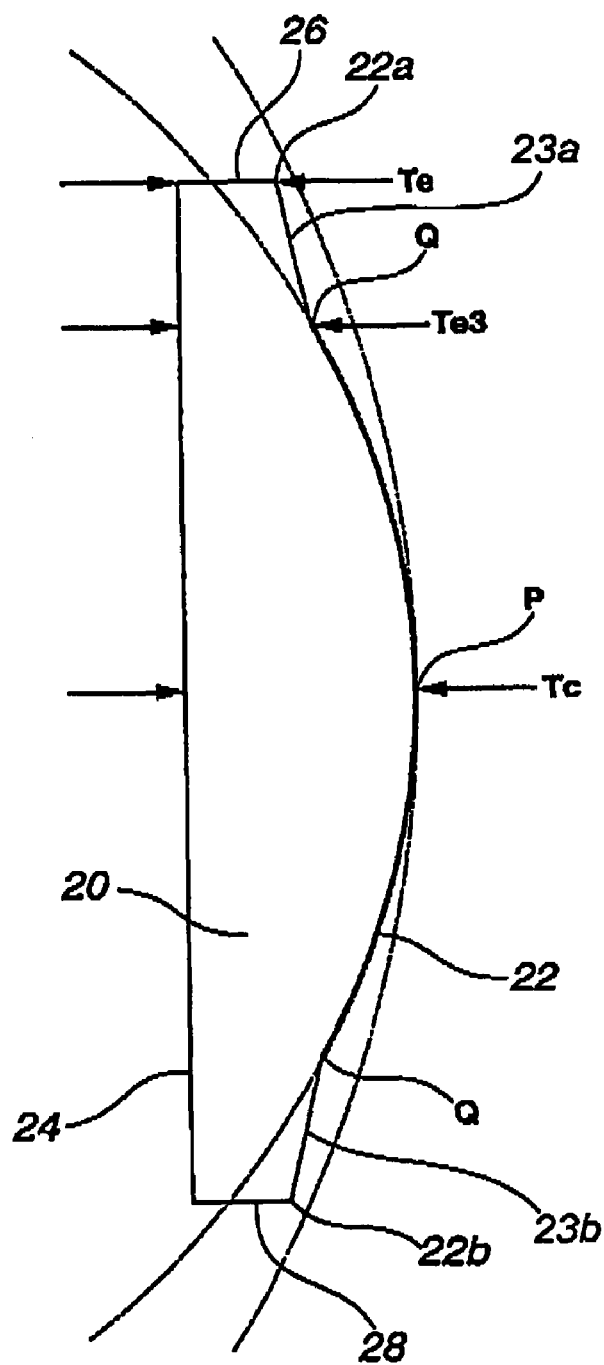
FIG. 5 is an enlarged view of the magnet of FIG. 4.
Figure 6:
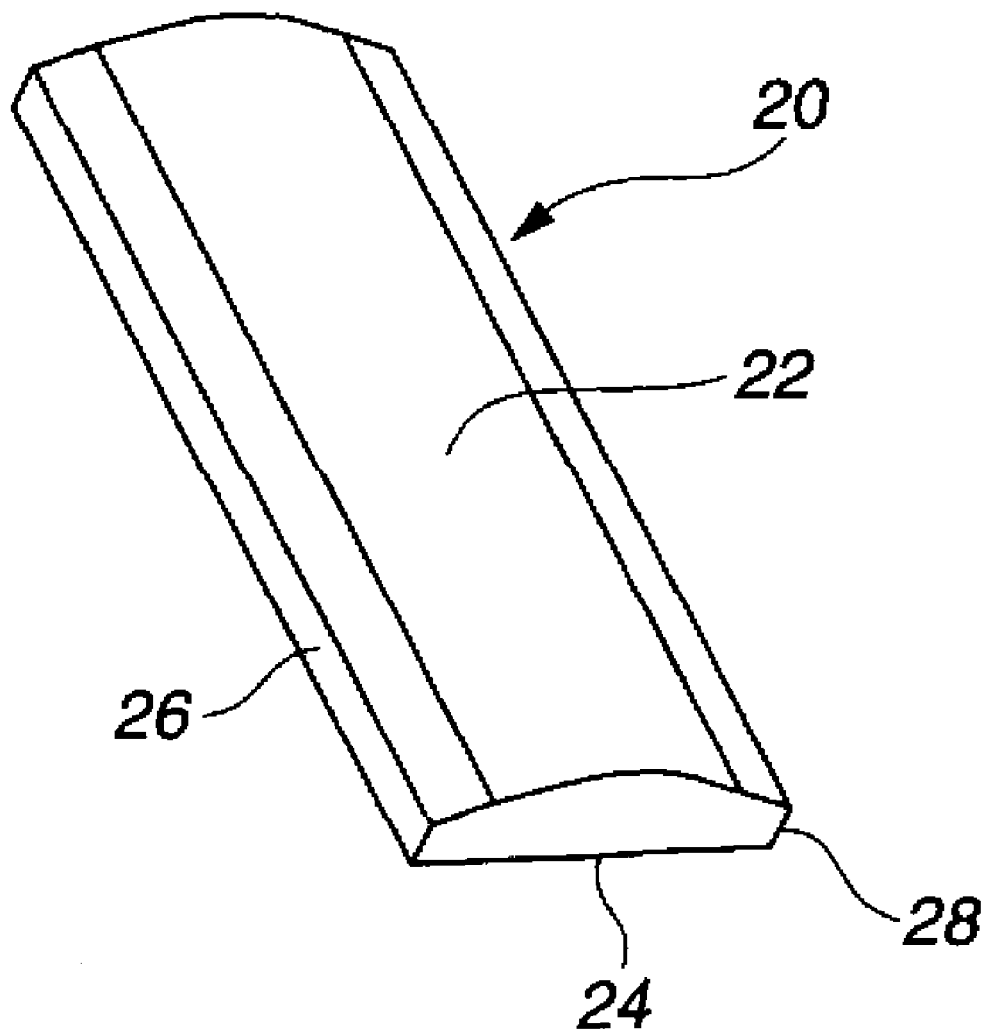
FIG. 6 is a perspective view of the magnet of FIG. 4.
Figure 7:
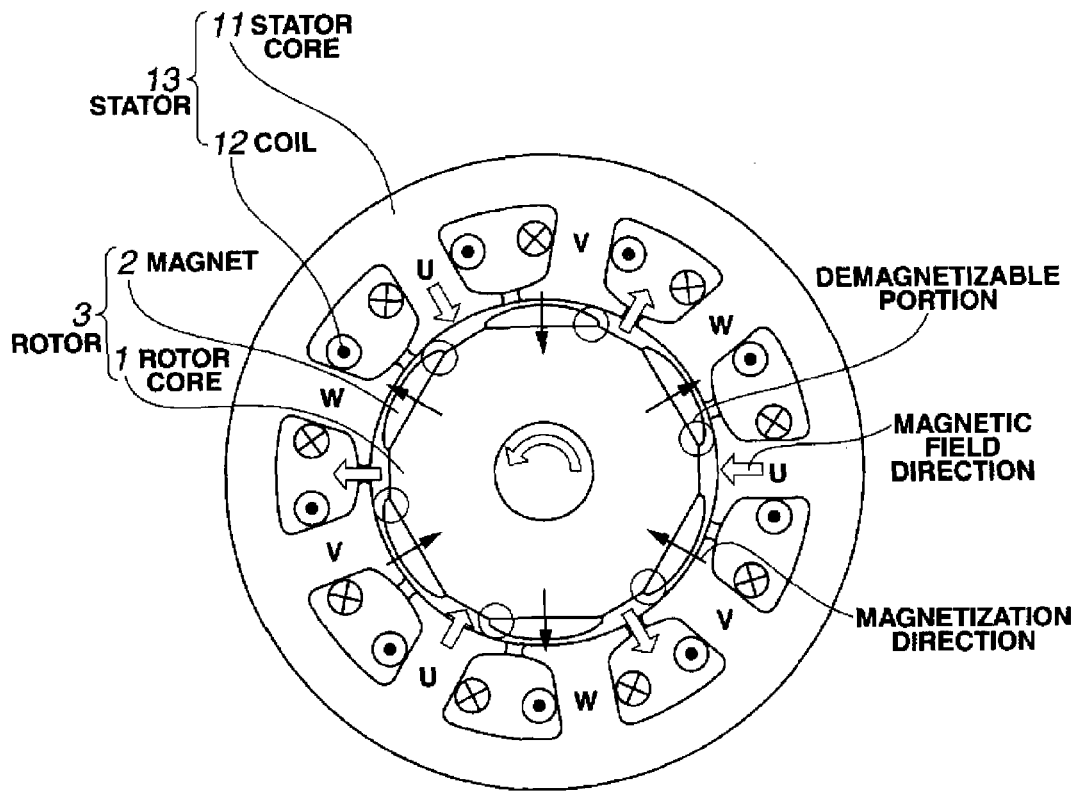
FIG. 7 is a cross-sectional view of a permanent magnet rotating machine in a further embodiment of the invention.

In the magnet of FIGS. 4 to 6, the generally arcuate top surface 22 includes an arcuate central region and linear transversely opposed end regions 22a, 22b which obliquely extend from the ends of the central region to the side surfaces 26, 28 of the magnet 20, and an extension of the linear end region toward the arcuate central region passes the apex P of the arcuate central region. In the magnet of FIGS. 4 to 6, Te3 is a thickness at an intersection Q between a straight line connecting the opposed end regions 22a, 22b with the apex P and the phantom small circle T. The inclination from 22a, 22b to the intersection Q is a straight line. The portion of the top surface 22 of the magnet from 22a, 22b to each interection Q is oblique end 23a, 23b, respectively.

The D-shaped magnet may be obtained by preparing a preselected alloy by a powder metallurgy or strip casting technique, pulverizing the alloy, compacting the powder in a magnetic field by means of a die, and sintering the compact. The material may be machined to a desired shape prior to or after the sintering step using a machining tool, grinding tool or the like. In this way, an elongated magnet segment of D-shaped cross section is obtained as shown in FIGS. 3 and 6. The magnet thus obtained may be surface processed by plating or coating.

A permanent magnet rotating machine according to the invention is illustrated in FIG. 7 as comprising a rotor 3 including a rotor core 1 and a plurality of D-shaped permanent magnet segments 2 attached to the surface of the core, and a stator 13 surrounding the rotor 3 to define a gap therebetween and including a stator core 11 having a plurality of slots and coils 12 received in the slots.

The number of magnet segments used in the machine is not particularly limited. Typically an even number of at most 100 magnet segments, and preferably 4 to 36 magnet segments are circumferentially arranged so that the polarity is alternately opposite in the circumferential direction.

One exemplary permanent magnet rotating machine comprises a rotor including a rotor core yoke and a plurality of permanent magnet segments arranged on the side surface of the rotor core yoke at predetermined intervals such that the polarity is alternately opposite in a circumferential direction of the rotor core yoke, and a stator surrounding the rotor to define a gap therebetween and including a stator core yoke, salient magnetic poles arranged on the stator core yoke at predetermined intervals in a circumferential direction thereof and opposed to said permanent magnet segments, and armature windings concentratedly wound on the salient magnetic poles and connected in three-phase connection.

The magnet material used herein is not particularly limited. Depending on a particular application, a choice may be made among alnico, ferrite, and rare earth magnets including Nd and Sm base magnets.

EXAMPLE

Examples are given below for further illustrating the invention although the invention is not limited thereto. In Examples, Nd—Fe—B permanent magnets were used.

Examples 1 and 2 and Comparative Example 1

A permanent magnet was prepared as follows. Nd, Fe, Co, and M metals having a purity of 99.7% by weight (M=Al, Si and/or Cu) and boron having a purity of 99.5% by weight were provided, melted in a vacuum melting furnace, and cast into an ingot of Nd2-Fe14-B ingot. The ingot was crushed on a jaw crusher and pulverized on a jet mill using a nitrogen stream, into a fine powder having an average particle size of 3.5 μm. The powder was filled in a mold. Using a perpendicular magnetic field press, it was compacted in a magnetic field of 12 kG and under a pressure of 1.0 t/cm$^2$. The green compact was sintered in an argon gas at 1,090° C. for 1 hour and subsequently, heat treated at 580° C. for 1 hour. The sintered body as heat treated was a parallelepiped block. Using a grinding tool, the block was ground into a D-shaped permanent magnet. The permanent magnet had Br=13.0 kG, iHc=22 kOe, and (BH)max=40 MGOe, as measured by a VSM.

Figure 8:
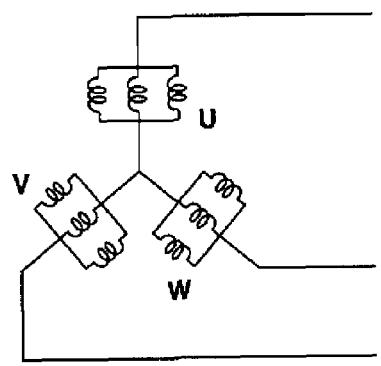
FIG. 8 illustrates the connection of coils in the rotating machine.
Figure 9:
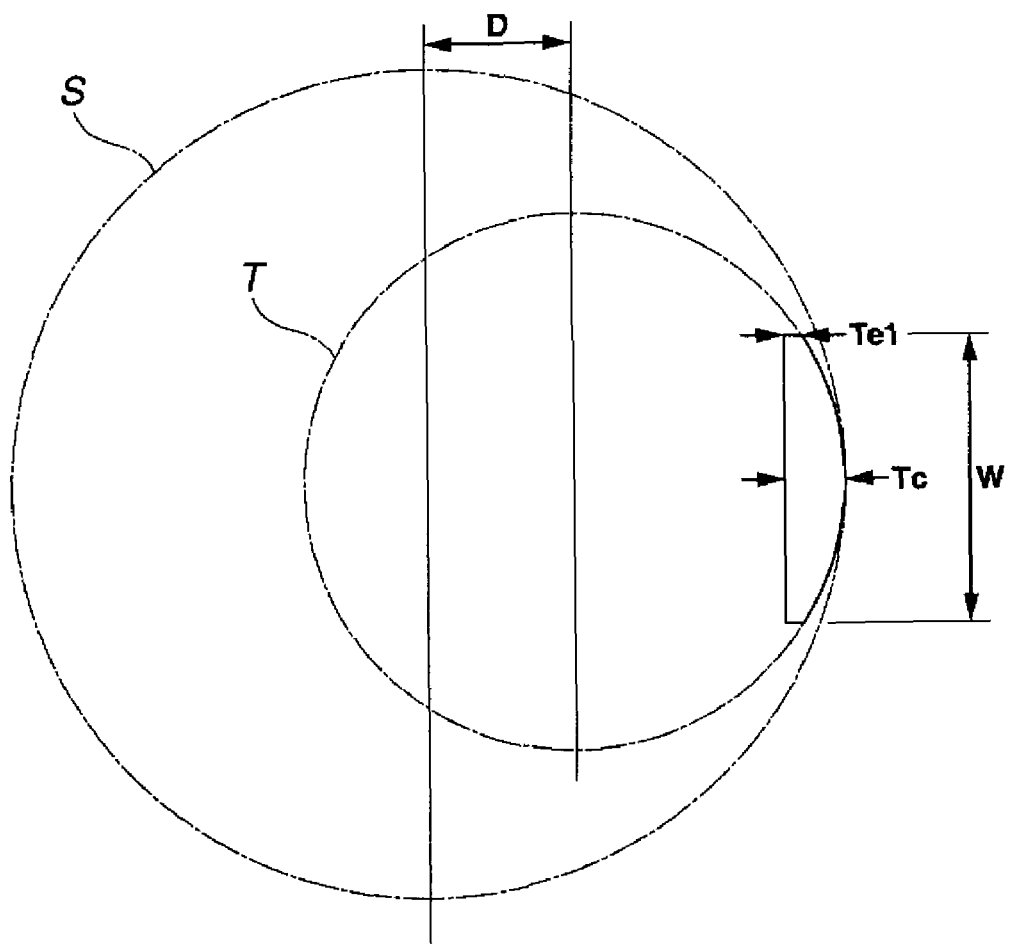
FIG. 9 is a cross-sectional view of one exemplary prior art permanent magnet.
Figure 10:
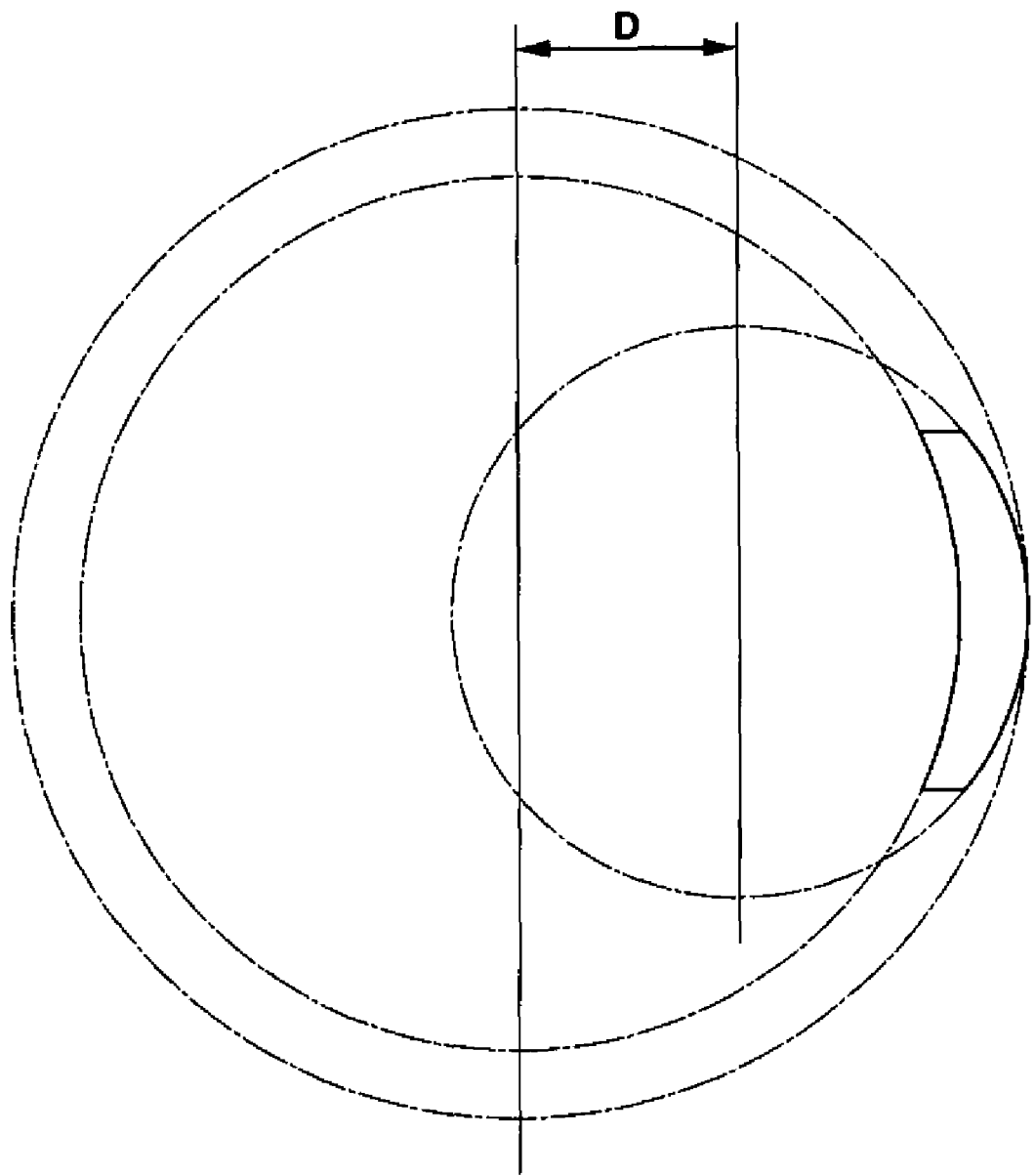
FIG. 10 is a cross-sectional view of another exemplary prior art permanent magnet.

In Comparative Example 1, a motor was constructed as a 6 pole, 9 slot motor of the structure shown in FIG. 7. The rotor and stator had an axial length of 70 mm. The rotor had a diameter of 45 mm. The coils were connected as shown in FIG. 8, with the number of windings being 15 turns per tooth. D-shaped permanent magnets shown in FIG. 9 were used. The magnet of FIG. 9 has a width W of 15 mm. The phantom great circle S has a diameter of 45 mm, the phantom small circle T has a diameter of 31 mm, and the off-center distance D (i.e., the distance between the center of the great circle and the center of the small circle) is 7 mm. The magnet includes a central portion having a thickness Tc of 3 mm and end portions having a thickness Te1 of 1 mm. The cogging torque of the motor was measured, and the drive torque of the motor measured by conducting sine-wave three-phase current having a RMS value of 150 A (⅓ current flow per coil because the coils of respective phases are parallel as shown in FIG. 8) as the input at room temperature (RT).

To evaluate demagnetization upon exposure at elevated temperature, the motor was placed in an oven at 140° C. where it was similarly rotated by conducting current of 150 A. The motor was taken out of the oven, cooled down to room temperature (23° C.), and similarly rotated by conducting current of 150 A, during which the drive torque was measured. A difference in drive torque at RT before and after oven placement was calculated as follows and reported as "percent demagnetization."

A percent reduction of torque by demagnetization=
[(drive torque at RT after oven placement)−(drive torque at RT before oven placement)]/(drive torque at RT before oven placement)

Table 1 tabulates the values of cogging torque, drive torque and percent demagnetization. The cogging torque is a difference between maximum and minimum of pulsating waves. The drive torque is an average. The motor showed a cogging torque which is about 0.44% of the drive torque, indicating minimal cogging torque. Since the control motor is generally designed to achieve a cogging torque of 1% or below, the result is fully satisfactory. However, a demagnetization was observed at 140° C., indicating that the motor could not be used in an environment at 140° C.

In Example 1, a motor was evaluated in which a rotor having D-shaped permanent magnets shown in FIGS. 1 to 3 was assembled with a stator as in Comparative Example 1. The test items and driving conditions are the same as in Comparative Example 1. The magnet of FIG. 1 has a width W of 15 mm and an off-center distance D of 8 mm. The magnet includes a central portion having a thickness Tc of 3 mm and end portions having a thickness Te of 1.5 mm (FIG. 2). The distance 1 from the bottom surface 24 to the intersection between the small circle T and the side surface was 0.9 mm, and the distance Te2 from the bottom surface 24 to the intersection between the great circle S and the side surface was 1.7 mm.

Table 1 tabulates the values of cogging torque, drive torque and percent demagnetization. The cogging torque is less than that of Comparative Example 1, and the drive torque is greater than that of Comparative Example 1. No demagnetization was observed at 140° C.

In Example 2, a motor was evaluated in which a rotor having D-shaped permanent magnets shown in FIGS. 4 to 6 was assembled with a stator as in Comparative Example 1. The test items and driving conditions are the same as in Comparative Example 1. The magnet of FIG. 4 has a width W of 15 mm and an off-center distance D of 8 mm. The magnet has a central portion thickness Tc of 3 mm, an edge thickness Te of 1.5 mm, and a thickness Te3 of 2.2 mm.

Table 1 tabulates the values of cogging torque, drive torque and percent demagnetization. The cogging torque is slightly more than that of Comparative Example 1, but clears the target of 1% of the drive torque or below. The drive torque is greater than in Comparative Example 1 and even in Example 1. No demagnetization was observed at 140° C.

TABLE 1

|  | Cogging torque (Nm) | Drive torque (Nm) | Demagnetization (%) |
| --- | --- | --- | --- |
| Example 1 | 0.025 | 9.5 | 0 |
| Example 2 | 0.050 | 9.6 | 0 |
| Comparative Example 1 | 0.040 | 9.1 | 4 |

Japanese Patent Application No. 2006-233450 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A permanent magnet having a D-shaped cross section including a generally arcuate top surface, a flat bottom surface, and side surfaces, said generally arcuate top surface including a central region with an apex and transversely opposed end regions, wherein provided that a plurality of permanent magnets are circumferentially arranged so that a phantom great circle circumscribes the apexes on the arcuate top surfaces of the magnets, the central region of the magnet top surface delineates a contour which is entirely coincident with an arc of a phantom small circle off-centered from said great circle and having a smaller diameter than said great circle, said small circle and the magnet side surface intersect each other, and each of the transversely opposed end regions of the magnet top surface is positioned outside the intersection between said small circle and the magnet side surface and inside said great circle.

2. The permanent magnet of claim 1 wherein said generally arcuate top surface includes an arcuate central region and transversely opposed linear end regions which extend from the ends of the central region to the side surfaces of the magnet and parallel to the flat bottom surface of the magnet.

3. The permanent magnet of claim 1 wherein said generally arcuate top surface includes an arcuate central region and transversely opposed linear oblique end regions which extend from the ends of the central region to the side surfaces of the magnet, and an extension of the linear oblique end region toward the arcuate central region passes the apex of the arcuate central region.

4. A permanent magnet rotating machine comprising the permanent magnet of claim 1.

5. The permanent magnet of claim 1, wherein each thickness Te of transversely opposed end portions, a distance Te1 from the bottom surface to the intersection between said small circle and the side surface, and a distance Te2 from the bottom surface to the intersection between said great circle and an extension of the side surface satisfy the relationship:

Te1<Te≦Te2.

6. The permanent magnet of claim 1, wherein a radius s of said great circle and a radius t of said small circle satisfy the relationship: 0.3≦t/s≦0.8.

7. The permanent magnet of claim 1, wherein the magnet is magnetized along the direction of thickness of an arcuate central portion.

* * * * *